(12) United States Patent
Prince

(10) Patent No.: US 8,140,394 B2
(45) Date of Patent: Mar. 20, 2012

(54) PAYMENT SYSTEM

(76) Inventor: Shane Eric John Prince, Little Bay (AU)

( * ) Notice: Subject to any disclaimer, the term of this patent is extended or adjusted under 35 U.S.C. 154(b) by 361 days.

(21) Appl. No.: 11/915,575

(22) PCT Filed: May 26, 2006

(86) PCT No.: PCT/AU2006/000697
§ 371 (c)(1),
(2), (4) Date: Jul. 7, 2008

(87) PCT Pub. No.: WO2006/125266
PCT Pub. Date: Nov. 30, 2006

(65) Prior Publication Data
US 2009/0055279 A1    Feb. 26, 2009

(30) Foreign Application Priority Data

May 26, 2005  (AU) .................................. 2005902707
May 27, 2005  (AU) .................................. 2005902710

(51) Int. Cl.
*G06Q 20/00* (2006.01)

(52) U.S. Cl. .............. 705/17; 705/40; 705/44; 705/400; 235/380; 709/203; 709/217; 709/232

(58) Field of Classification Search .................... 705/17, 705/26; 700/232
See application file for complete search history.

(56) References Cited

U.S. PATENT DOCUMENTS

| | | | | |
|---|---|---|---|---|
| 5,883,810 | A * | 3/1999 | Franklin et al. | 700/232 |
| 6,424,706 | B1 * | 7/2002 | Katz et al. | 379/144.01 |
| 6,741,968 | B2 * | 5/2004 | Jacoves et al. | 705/14.23 |
| 2003/0004828 | A1 * | 1/2003 | Epstein | 705/26 |
| 2007/0112671 | A1 * | 5/2007 | Rowan | 705/39 |
| 2007/0198432 | A1 * | 8/2007 | Pitroda et al. | 705/64 |

* cited by examiner

*Primary Examiner* — Vanel Frenel
(74) *Attorney, Agent, or Firm* — Mark M. Friedman

(57) ABSTRACT

A payment system transfers funds from a purchaser to a supplier of goods and services. A single use transient credit code provided to the purchaser effects the transfer. The transient credit code is redeemable to a value limited to said transfer of funds thereby preventing subsequent fraudulent use of the code. The payment system apparatus transfers a payment from a purchaser to a supplier of goods and services. The apparatus incorporates a code issue device which keeps track of and generates a list of limited-value, single-use credit codes. The device issues the codes on request, receives notification of use of the codes and marks respective, ones as used. The transfer is done by single-use transient credit codes provided to the purchaser. The codes are redeemable to the value limited to a payment.

41 Claims, 3 Drawing Sheets

PAYMENT SYSTEM

RELATED APPLICATIONS

This application is the U.S. National Phase of PCT/AU2006/000697 filed May 26, 2006 and claims priority to Australian Provisional Patent Application Nos. 2005902707 filed May 26, 2005 and 2005902710 filed May 27, 2005, which are hereby incorporated herein by reference in their entirety.

The present invention relates to methods and systems for payment of goods or services and, more particularly, to a system of making payments which insulates a user from credit card fraud.

BACKGROUND

Many transactions are now made between a purchaser and a supplier of goods and services without actual cash passing to the supplier. Such transactions particularly apply to purchases made by phone orders or over the Internet system. Payment is then commonly made by means of the purchaser's credit card, the details of which are used by the supplier to be credited with the purchase price of the article. This credit is made available by the merchant code supplier which issued the credit card.

The details required to effect a purchase in this way include inter alia the credit card number, the name of the owner of the card and the card's expiry date. This information when transmitted verbally by phone, or by entry onto a web page of the internet, is then substantially beyond the control of the owner of the card and he or she is at risk of fraudulent use of the information, either for unauthorised use of the funds represented by the card, or the establishment of a bogus identity for the purpose of fraud. Transmission of the credit card details over a public computer network such as the internet also involves the additional risk of interception of those details by a third party. The consequences of such misuse of the information can be serious for the card holder, the merchant and the merchant code supplier.

It is an object of the present invention to address or at least ameliorate some of the above disadvantages.

BRIEF DESCRIPTION OF INVENTION

Accordingly, in one broad form of the invention there is provided a payment system for the transfer of funds from a purchaser to a supplier of goods or services; said transfer effected by means of a single use transient credit code provided to said purchaser; said transient credit code redeemable to a value limited to said transfer of funds thereby preventing subsequent fraudulent use of said transient credit code.

Preferably the identity of said purchaser is not linked to said transient access code.

Preferably said transient credit code expires on completion of said transfer of funds or on exhaustion of funds allocated to said transient credit code.

Preferably at least one said transient credit code is obtainable by said purchaser from a payment system hub on presentation to said payment system hub of an access code.

Preferably said access code is obtained by said purchaser from said payment system hub through an intermediate facilitator.

Preferably said intermediate facilitator orders said access code from said payment system hub on receipt of payment by said purchaser; said payment comprising a selected credit value and a service component.

Preferably said selected credit value is equal to or greater than said transfer of funds.

Preferably said purchaser selects a value for said transient access code.

Preferably said purchaser selects a transient credit code supplier.

In a further broad form of the invention there is provided a method of payment of a purchase value by a purchaser for a purchase of goods or services from a supplier; said method including the steps of:
 (a) making a payment to an intermediate facilitator; said payment comprising said purchase value and a service charge,
 (b) said intermediate facilitator obtaining for said purchaser a unique access code from a payment system hub,
 (c) said purchaser acquiring a transient credit code from said payment system hub,
 (d) said purchaser providing said transient credit code to said supplier,
 (e) said supplier redeeming a value assigned to said transient credit code.

Preferably said payment to said intermediate facilitator is face to face by means of cash.

Preferably said payment to said intermediate facilitator is face to face by means of a conventional credit card or any other account through conventional commercial electronic fund transfer at point of sale (EFTPOS).

Preferably said unique access code remains obscured from scrutiny by said intermediate facilitator.

Preferably said purchaser uses said unique access code to order at least one said transient credit code from said payment system hub; said purchaser selecting a credit value and a transient credit code provider for each said at least one transient credit code.

Preferably said payment system hub purchases said at least one transient credit code redeemable for said credit value from said transient credit code provider.

Preferably said transient credit code provider is a financial institution.

Preferably a redeemable value assigned to any said at least one transient credit code is equal to said purchase value.

Preferably each said transient credit code expires when said purchase value is redeemed by use of said transient credit code.

BRIEF DESCRIPTION OF DRAWINGS

Embodiments of the present invention will now be described with reference to the accompanying drawings wherein.

DETAILED DESCRIPTION OF PREFERRED EMBODIMENTS

First Preferred Embodiment

The system of the present invention provides a means of making a payment to a remote Supplier of Goods and Services in such a way that the information provided to the supplier cannot subsequently be fraudulently used to the detriment of the Purchaser. The system prevents interception of electronic transmission of account details over a public network and also allows those not wishing to obtain a traditional credit card to use cash via the system in transactions with suppliers who will or can only accept certain forms of payment such as through credit cards.

Figure 1:
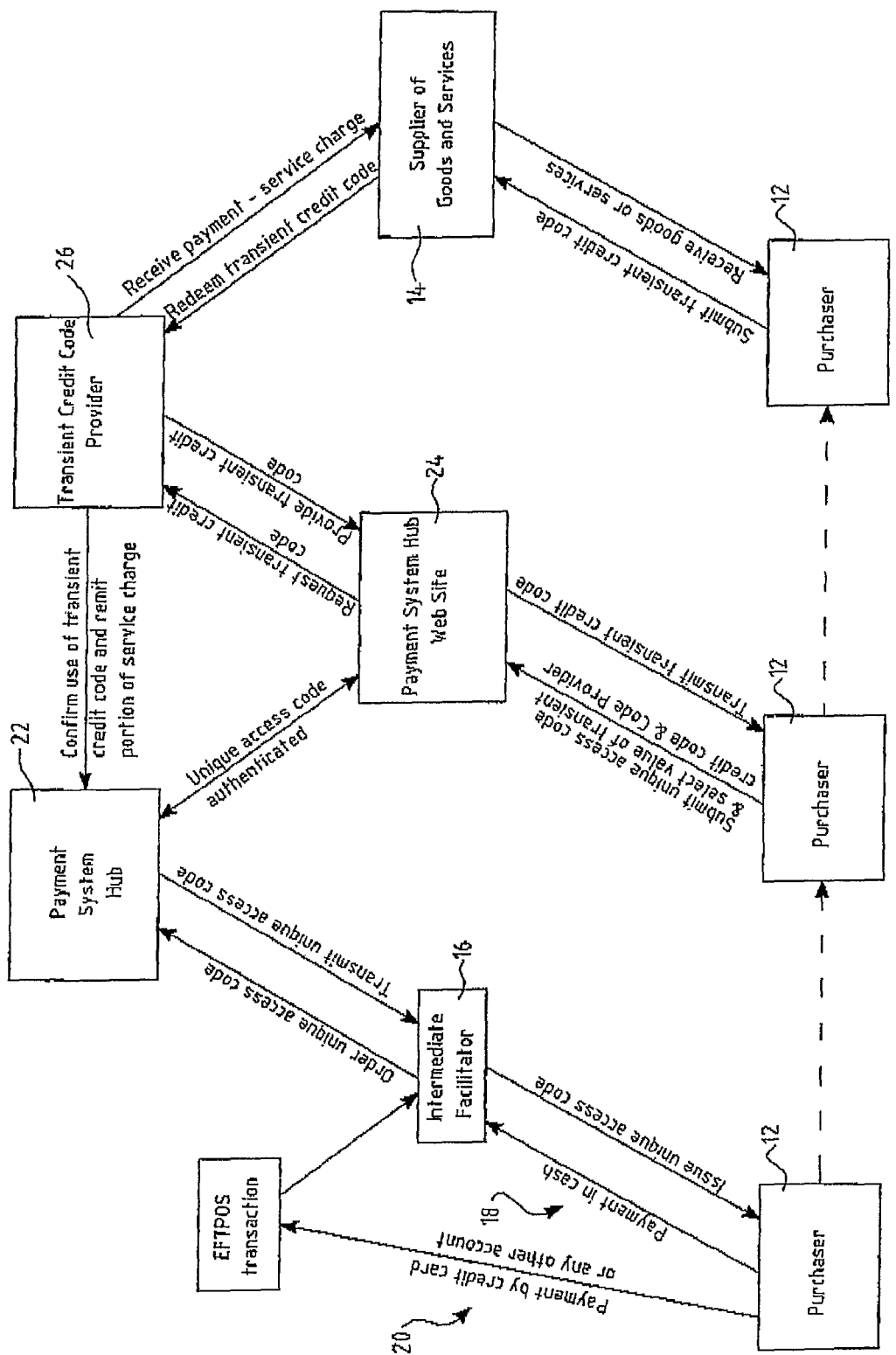
FIG. 1 is a representation of a preferred embodiment of a payment system according to the invention.

With reference to the flow diagram of FIG. 1, a transfer for funds for a purchase of goods or services from a supplier is implemented in a number of steps by means of a Transient Credit Code. In this specification the term "Transient Credit Code" encompasses one or more unique numerical or alpha-numerical strings which, when presented to a specified financial institution by a supplier of the goods or services, is redeemable once only for a predetermined value. Furthermore, the Transient Credit Code of the present invention is not linked in any way to the identity of the Purchaser of the goods or services.

A Purchaser 12 who wishes to make payment for a purchase from a Supplier of goods or services 14, for example over a distributed communication system such as the internet or by telephone, firstly makes use of the services of an Intermediate Facilitator 16. An Intermediate Facilitator may be a bank, post office, department store, Internet Cafe or any other institution provided with electronic funds transfer at point of sale (EFTPOS) facilities.

The Purchaser 12 makes a payment, either in cash 18 or by conventional credit card or other EFTPOS transaction 20 to the Intermediate Facilitator 16 to order a Unique Access Code from a Payment System Hub 22. In this specification the term "Unique Access Code" encompasses a unique numerical or alpha-numerical string which, when submitted to the Payment System Hub 22 validates a request for a Transient Credit Code.

Payment to the Intermediate Facilitator will include a value nominated by the Purchaser 12 and a service component. The value nominated together with a portion of the service component, are electronically transferred to the Payment System Hub 22 by the Intermediate Facilitator 16. The Intermediate Facilitator retains the remaining portion of the service component. This transfer may be made through the EFTPOS system or a separate dedicated electronic funds transfer system.

The Payment System Hub 22 now transmits a Unique Access Code back to the Intermediate Facilitator 16 which passes the code on to the Purchaser 12, for example as shown in FIG. 4, on a printed docket 36 generated by a terminal 38 of the EFTPOS or dedicated system. The Unique Access Code is recorded by the Payment System Hub 22 as enabling transfers of funds up to the value nominated by the Purchaser 12. Note that the Payment System Hub does not acquire a knowledge or record of the Purchaser's identity. It only retains a record of the Access Code Provided and the value nominated. The value nominated is retained as a "float" against the Unique Access Code.

It should be noted that in some jurisdictions it may be necessary that the identity of a user of a transient credit code or transient credit card can be traced by appropriate lawful authorities. In that case, an Intermediate Facilitator will demand proof of identity of a Purchaser prior to processing a request for a Unique Access Code and retain that identification data together with the date and time of purchase. The Payment System Hub for its part retains information as to when and to which Intermediate Facilitator a particular Unique Access Code was transmitted as well as what Transient Credit Code or codes were issued against the Access Code. Thus a traceable sequence is created by which the identity of a Purchaser can be determined.

The Unique Access Code which is now in the possession of the Purchaser 12, may be used by him or her to acquire one or more Transient Credit Codes, each Transient Credit Code being for a value selected by the Purchaser. The one or cumulative value of the Transient Credit Codes is limited to the recorded value nominated by the Purchaser when initially requesting the Unique Access Code through the Intermediate Facilitator 16.

Transient Credit Codes may be obtained by the purchaser by using the Unique Access Code, provided by the Payment System Hub 22, to gain entry to a secure page of an internet web site 24 maintained by the Payment System Hub. Alternatively, the Unique Access Code can be submitted by the Purchaser by telephone. The submitted Unique Access Code is authenticated by the Payment System Hub 22 and the purchaser may then select a value for the Transient Credit Code up to the recorded value nominated. Clearly, a Purchaser may purchase a number of separate Access Codes and may nominate their combined or a portion of their combined value for credit to a Transient Credit Code.

The Purchaser and may also select a preferred Transient Credit Code Provider. Providers may be any conventional credit card provider such as VISA, Mastercard, PayPal or B-Pay Credit for example, Typically, the Provider may be the bank or other financial service provider already used by the Purchaser.

The Payment System Hub now requests a Transient Credit Code from the nominated Provider for the selected value, transferring to the Provider the selected value from the retained float. The Transient Credit Code received from the provider is transmitted to the purchaser, either over a secure page of its web site, by email or by telephone. The purchaser may elect the means by which the Transient Credit Code is communicated. If made available via the Payment System Hub web site, the code is posted during the on-line session in which the purchaser requested it or in a subsequent on-line session but in either case, it is only displayed when the purchaser activates the code. Thus the code is only briefly present on the web site, minimising the possibility of access by unauthorized persons.

The Transient Credit Code now functions in an analogous way to a conventional credit card or PayPal credit in that its identifying numerical or alpha-numerical string may be provided by telephone, mail or email to the supplier of the goods or services purchased. However, when the supplier 14 presents the Transient Credit Code to the selected Transient Credit Code Provider 26 for payment, the Transient Credit Code is cancelled or expires, as payment to the selected value minus a service charge is made to the supplier. Thus the Transient Credit code is a single use code and of no further use to either the purchaser or the supplier, although the same numeric or alpha-numeric string may of course be re-issued at some future date for some other transaction.

Second Preferred Embodiment

In this second preferred embodiment, the system of the present invention functions as described for the First Embodiment described above. However, it may happen that the one or more transactions for which the float is used by a purchaser 12, is not entirely utilised, leaving an amount too small to be useful for the credit card like transactions for which the system is intended. In this case the purchaser may "top up" the float to its original or some selected new and useful nominated value.

The process of topping up, or of setting the float to some other desired value, is again achieved via an Intermediate Facilitator 16 as described above. However in this instance, the Purchaser provides the further Unique Access Code to the Payment System Hub and nominates the amount of the top-up. The Payment System Hub on verification of the Unique Access Code, passes the value of the top-up to the Transient Credit Code Provider attributes a further value to the Transient Credit Code, as well as issuing any other information as required such as a new expiry date through the Payment System Hub 12.

The Purchaser may now proceed as described before, using the same Unique Access Code to request Transient Credit Codes for selected values.

Third Preferred Embodiment

In a further preferred form of the present system, a Purchaser 12 may make use of on-line payment facilities such as B-Pay. In this type of system, a Purchaser 12 uses on-line banking facilities to transfer money from a nominated account held with the bank to a nominated recipient; that is to a Supplier of Goods and Services 14.

In such a system the Supplier 14 of the goods and/or services is identified and known to the bank by a unique number know as a Biller Code. The account nominated by the Purchaser from which funds are to transferred to a Supplier may be the Purchaser's bank account or a credit card such as VISA, Mastercard and the like.

Figure 2:
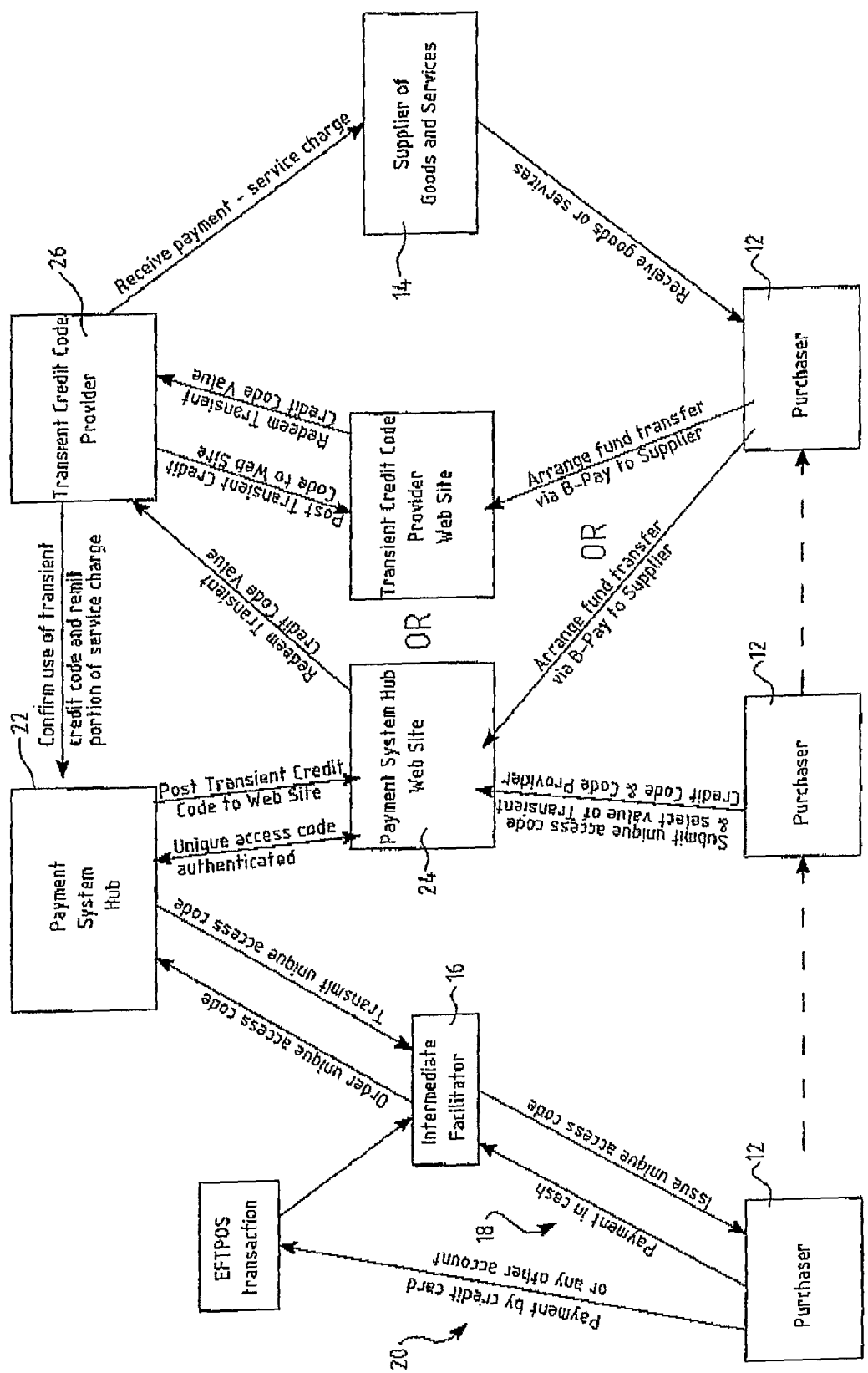
FIG. 2 is a representation of a further preferred embodiment of the payment system according to the invention.

In this embodiment of the invention, illustrated in FIG. 2, the Purchaser 12 has again established a float with the Payment System Hub 22 and has been issued a Unique Access Code. A purchase of goods or service from a Supplier 14 is invoiced by the Supplier, the invoice quoting the Biller Code for payment by the B-Pay system, as well as a transaction identifier number.

The Purchaser 12 uses his or her Unique Access Code to apply for a Transient Credit Code to the value of the invoice to be paid. The Transient Credit Code may then again be posted on the web site 24 of the Payment System Hub as previously described, or on the web site 25 of the Transient Credit Code Provider 26, as shown in FIG. 2.

The Purchaser 12 may then make payment over the B-Pay (or similar system) nominating the Transient Credit Code as the source "account" from which the transfer of funds is to be made.

Fourth Preferred Embodiment

In this preferred embodiment with reference to FIG. 3, a Purchaser 12 again initially establishes a float of funds to a nominated value with the Payment System Hub 22 via an Intermediate Facilitator 16 using cash or an EFTPOS system. As before, this elicits from the Payment System Hub 22 a Unique Access Code. However in this embodiment, when the Purchaser requires a Transient Credit Code, this is supplied in the form of a special Transient Credit Card 30.

The Transient Credit Card 30 is provided with a magnetic strip 32 containing only the issued Transient Credit Code. The Card 30 may also be embossed with the Transient Credit Code 34, but neither the magnetic strip 32 nor the surface of the card carries any other information related to financial transactions for which the Card 30 may be used.

The Transient Credit Card 30, may be produced at a central facility as part of the infrastructure of the Payment System Hub 22 and posted or couriered to the Purchaser 12. However in a preferred arrangement, blank Transient Credit Cards 30 may be provided by the Intermediate Facilitator and encoded with the Transient Credit Code using a suitable Transient Credit Card Issuing Unit 40, once the steps of submitting the Unique Access Code and nominating a value to Payment System Hub has been completed. These steps may be completed by telephone or over an Internet access facility maintained by the Facilitator.

The process for obtaining the Transient Credit Card is then as follows. The Purchaser 12 requests the Intermediate Facilitator to arrange acquisition of one or more Transient Credit Cards. As before, payment is made to the Intermediate Facilitator 16 either in cash or by means of a conventional credit card to a nominated value made up of the float to be transferred to the Payment System Hub 22 and the service component. However the information now transmitted to the Payment System Hub 22 now includes the nominated value/s of the Transient Credit Card/s to be provided.

The Payment System Hub 22 processes the request and returns to the Intermediate Facilitator 16 a Transient Credit Code for the, or each nominated value including the necessary commands to activate the Transient Credit Card Issuing Unit 40. If the value or sum of values of the Transient Credit Cards is less than the established float, the Payment System Hub 22 also transmits the Unique Access Code associated with the float. The Unique Access Code may then be used at some future date to access further Transient Credit Cards, acquire Transient Credit Codes, or top up the float, as described in the embodiments above.

In a further preferred alternative, the Purchaser is equipped with Transient Credit Card encoding apparatus linked to the Purchaser's computer. In this arrangement the Purchaser has previously acquired a Unique Access Code through an Intermediate Facilitator as described above. The Purchaser may then log onto the Payment System Hub or Transient Credit Code Provider web site, enter the previously acquired Unique Access Code and request one or more Transient Credit Codes. These may then be written to the magnetic strip of blank Transient Credit Cards.

In its most basic form, the Transient Credit Card Issuing Unit 40 is adapted for writing the Transient Credit Code 34 to the magnetic strip 32 of a plastic carrier card. This carrier card may also be provided with an ink-friendly strip (not shown) which can accept a hand printed inscription of the Transient Access Code 34.

In a more preferred form of a Transient Credit Card Issuing Unit 40, the unit is further provided with embossing means adapted to embossing the Transient Access Code into the surface of the carrier card in the manner of a standard credit card. In this particular form, the Transient credit code 34 may be augmented by a nominal expiry date 42 to allow the card to be used as a single use, set value, conventional credit card. Although the apparatus here envisioned is an integrated unit capable of both writing to a magnetic strip and embossing it will be clear that these two functions could be implemented in two separate devices.

In Use

The system of the present invention is implemented through a combination of known computer hardware and communication technology, as well as contemplating some specialised devices for at least one of the above described embodiments.

Figure 3:
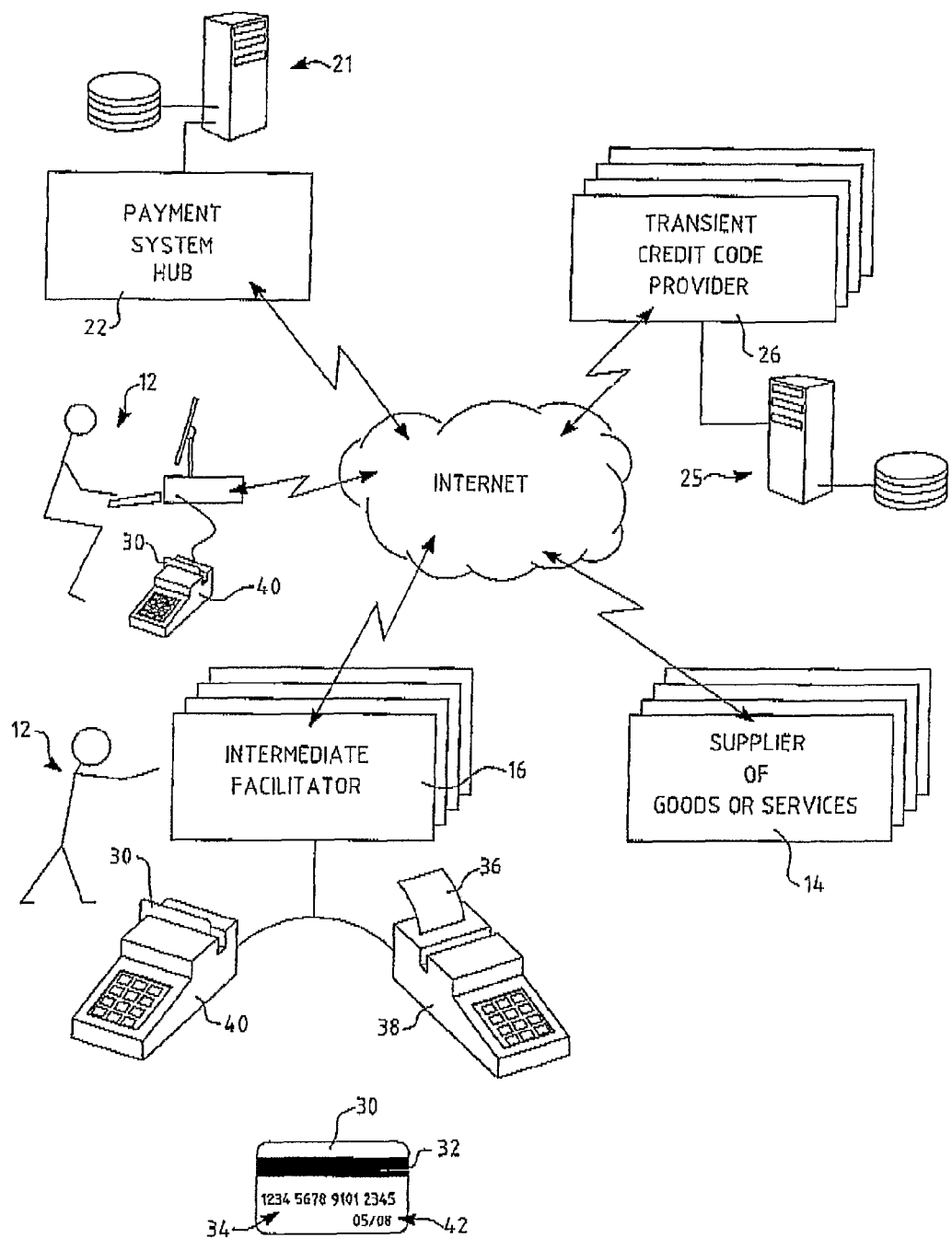
FIG. 3 is a representation of yet a further preferred embodiment of payment system and associated apparatus.

Known point-of-sale technology is used by the Intermediate Facilitator 16 of the system, to both order and receive a Unique Access Code from the Payment System Hub 22. The Purchaser 12 may use cash to establish the initial nominated value or "float", or the Purchaser 12 may use his or her own conventional credit card. In either case the Intermediate Facilitator 16 will use his or her own line of credit to electronically transfer funds to the Payment System Hub 22. The Hub 22 is provided with data processing and storage apparatus 21 (as shown in FIG. 3) which processes the received funds and issues the Unique Access Code.

In each case an electronic funds transfer apparatus 38 (or EFTPOS device) in communication with the data processing and storage apparatus 21 of the Payment System Hub 22 is the means used for the transfer of the funds provided by the Purchaser.

The electronic funds transfer apparatus 38 is typically provided with a printer facility adapted to provide a purchaser with a docket 36 detailing the transaction when approved by the credit provider. In the present system this approval will be transmitted back by the Payment System Hub 22 in the form of a Unique Access Code printed on the docket 36.

In the arrangement of the Fourth Embodiment above, the Intermediate Facilitator 16 is again provided with electronic funds transfer apparatus which, in this embodiment, is linked with a Transient Credit Card writing and, optionally, a Transient credit Card embossing facility 30. Blank cards are provided to selected Intermediate Facilitators 16, such as banks, post offices, department stores, Internet Cafes and other institutions equipped for electronic funds transfer.

A Purchaser 12 who then requires the benefits of anonymity and security offered by the present invention, may acquire one or more Transient Credit Cards 30 from the Intermediate Facilitator 16. These Transient Credit Cards then function as single use credit cards redeemable for the fixed nominated value only. In all other respects the Transient Credit Cards function in use as a conventional credit card in that they may be read by an electronic funds transfer apparatus, or the Transient Credit Code may be communicated by phone, in written form or over the distributed communication system such as the internet. As such they may be provided by established credit card providers, acting as the Transient Credit Code Providers, as an alternative to the long-term conventional credit card.

The above describes only some embodiments of the present invention and modifications, obvious to those skilled in the art, can be made thereto without departing from the scope and spirit of the present invention.

By way of summary there is provided a payment system for the transfer of a payment in the form of funds from a purchaser to a supplier of goods or services; said system incorporating a code issue device which keeps track of or generates a list of available limited value, single use credit codes; said device issuing said codes on request; said device receiving notification of use of said codes and marking respective ones as used; said transfer effected by means of respective ones of said single use transient credit codes provided to said purchaser; said transient credit codes redeemable to a value limited to said payment value.

What is claimed is:

1. A payment system for the transfer of funds from a purchaser to a supplier of goods or services; said transfer effected by means of an access code and a transient credit code provided to said purchaser; the access code provided to the purchaser upon making of a payment; said transient credit code being obtainable from a payment system hub on presentation thereto by said purchaser of said access code; said transient credit code redeemable to a value limited to said transfer of funds.

2. The system of claim 1 wherein the identity of said purchaser is not linked to said transient credit code.

3. The system of claim 1 wherein said transient credit code expires on completion of said transfer of funds or on exhaustion of funds allocated to said transient credit code.

4. The system of claim 1 wherein the transient credit code is selected via the payment system hub from one or more transient credit code providers at the choice of the purchaser.

5. The system of claim 4 wherein said access code is obtained by said purchaser from said payment system hub through an intermediate facilitator.

6. The system of claim 5 wherein said intermediate facilitator orders said access code from said payment system hub on receipt of payment by said purchaser; said payment comprising a selected credit value and a service component.

7. The system of claim 6 wherein said selected credit value is equal to or greater than said transfer of funds.

8. The system of claim 1 wherein said purchaser selects a value for said transient access code.

9. The system of claim 1 wherein said purchaser selects a transient credit code supplier.

10. A method of payment of a purchase value by a purchaser for a purchase of goods or services from a supplier; said method including the steps of;
   a. making a payment to an intermediate facilitator; said payment comprising said purchase value and a service charge,
   b. said intermediate facilitator obtaining for said purchaser a unique access code from a payment system hub,
   c. said purchaser obtaining a transient credit code from said payment system hub,
   d. said purchaser providing said transient credit code to said supplier, and
   e. said supplier redeeming a value assigned to said transient credit code.

11. The method of claim 10 wherein said payment to said intermediate facilitator is face to face by means of cash.

12. The method of claim 10 wherein said payment to said intermediate facilitator is face to face by means of a conventional credit card or any other account through conventional commercial electronic fund transfer at point of sale (EFT-POS).

13. The method of claim 10 wherein said unique access code remains obscured from scrutiny by said intermediate facilitator.

14. The method of claim 10 wherein said purchaser uses said unique access code to order at least one said transient credit code from said payment system hub; said purchaser selecting a credit value and a transient credit code provider for each said at least one transient credit code.

15. The method of claim 14 wherein said payment system hub purchases said at least one transient credit code redeemable for said credit value from said transient credit code provider.

16. The method of claim 14 wherein said transient credit code provider is a financial institution.

17. The method of claim 10 wherein a redeemable value assigned to any said at least one transient credit code is equal to said purchase value.

18. The method of claim 10 wherein each said transient credit code expires when said purchase value is redeemed by use of said transient credit code.

19. Funds transfer apparatus for transfer of funds from a purchaser of goods or services to a supplier of said goods or services; the apparatus including:
   a. a payment system hub in electronic communication via a distributed communication system with electronic funds transfer apparatus of at least one intermediate facilitator; said payment system hub adapted to issue a unique access code to said purchaser,
   b. at least one transient credit code provider in electronic communication with said payment system hub via said distributed communication system; said at least one transient credit code provider adapted to issuing a transient credit code to said purchaser when said purchaser submits said unique access code to said at least one transient credit code provider.

20. The apparatus of claim 19 wherein said funds transfer apparatus further includes apparatus for transferring to media, code data provided by said payment system hub and said at least one transient credit code provider.

21. The apparatus of claim 20 wherein said media includes a computer screen presented on a web site maintained by said payment system hub.

22. The apparatus of claim 21 wherein said at least one transient credit code is displayed on said screen on said web site.

23. The apparatus of claim 20 wherein said media includes a computer screen presented on a web site maintained by said at least one transient credit code provider.

24. The apparatus of claim 20 wherein said media includes a docket printed by a said electronic funds transfer apparatus maintained by a said intermediate facilitator.

25. The apparatus of claim 24 wherein said unique access code is printed on said docket.

26. The apparatus of claim 20 wherein said media includes a transient credit card; said transient credit card provided with a magnetic strip adapted to receive encoded therein said transient credit code.

27. The apparatus of claim 26 wherein said transient credit card is further provided with a region adapted to accept inscribed thereon said transient credit code.

28. The apparatus of claim 26 wherein said transient credit code is written to said magnetic strip by a magnetic strip writer apparatus.

29. The apparatus of claim 26 wherein said transient credit code is embossed into a surface of said transient credit card by an embossing apparatus.

30. The apparatus of claim 29 wherein said magnetic strip writer apparatus and said embossing apparatus are maintained by said at least one intermediate facilitator.

31. The apparatus of claim 29 wherein said magnetic strip writer apparatus and said embossing apparatus are maintained by said purchaser.

32. The apparatus of claim 19 wherein said apparatus further includes data processing and storage apparatus maintained by said purchaser.

33. The apparatus of claim 32 wherein said data processing and storage apparatus maintained by said purchaser is linked to apparatus for transfer to media of said code data.

34. The apparatus of claim 19 wherein said purchaser makes a payment to a said intermediate facilitator; said payment comprising a nominated value and a service component; said nominated value and a portion of said service component transferred to said payment system hub by means of electronic funds transfer apparatus.

35. The apparatus of claim 34 wherein a remaining portion of said service component is accredited to said intermediate facilitator.

36. The apparatus of claim 19 wherein said transient credit code is representative of a nominated value redeemable by a said provider of goods or services.

37. The apparatus of claim 19 wherein said purchaser provides a said provider of goods or services with said transient credit code in payment for said goods or services.

38. The apparatus of claim 19 wherein said purchaser uses said transient credit code as a source for electronic transfer of funds from said at least one transient credit code provider to a said provider of goods and services in an on-line banking transaction.

39. The apparatus of claim 19 wherein said transient credit code is valid for one only fund transfer transaction; said transient credit code expiring on completion of said one only fund transfer transaction.

40. Apparatus for providing a purchaser with a transient credit code; said transient credit code representative of a monetary value redeemable by a supplier of goods or services; said apparatus including electronic funds transfer apparatus and apparatus for transferring to media code data provided by data processing and storage apparatus of a payment system hub and of a transient credit code provider; said code data including a unique access code and a transient credit code.

41. A method of concealing the identity of a purchaser when transferring funds to a supplier for goods or services, the method including the steps of:
   a. said purchaser making a payment to an intermediate facilitator, said payment comprising a purchase value;
   b. said intermediate facilitator obtaining for said purchaser a unique access code from a payment system hub without revealing the identity of the purchaser to the payment system hub;
   c. said purchaser obtaining a transient credit code from said payment system hub on presentation of said access code to said payment system hub;
   d. said purchaser providing said transient code to said supplier; and
   e. said supplier redeeming a value assigned to said transient credit code.

* * * * *